Patented Feb. 9, 1926.

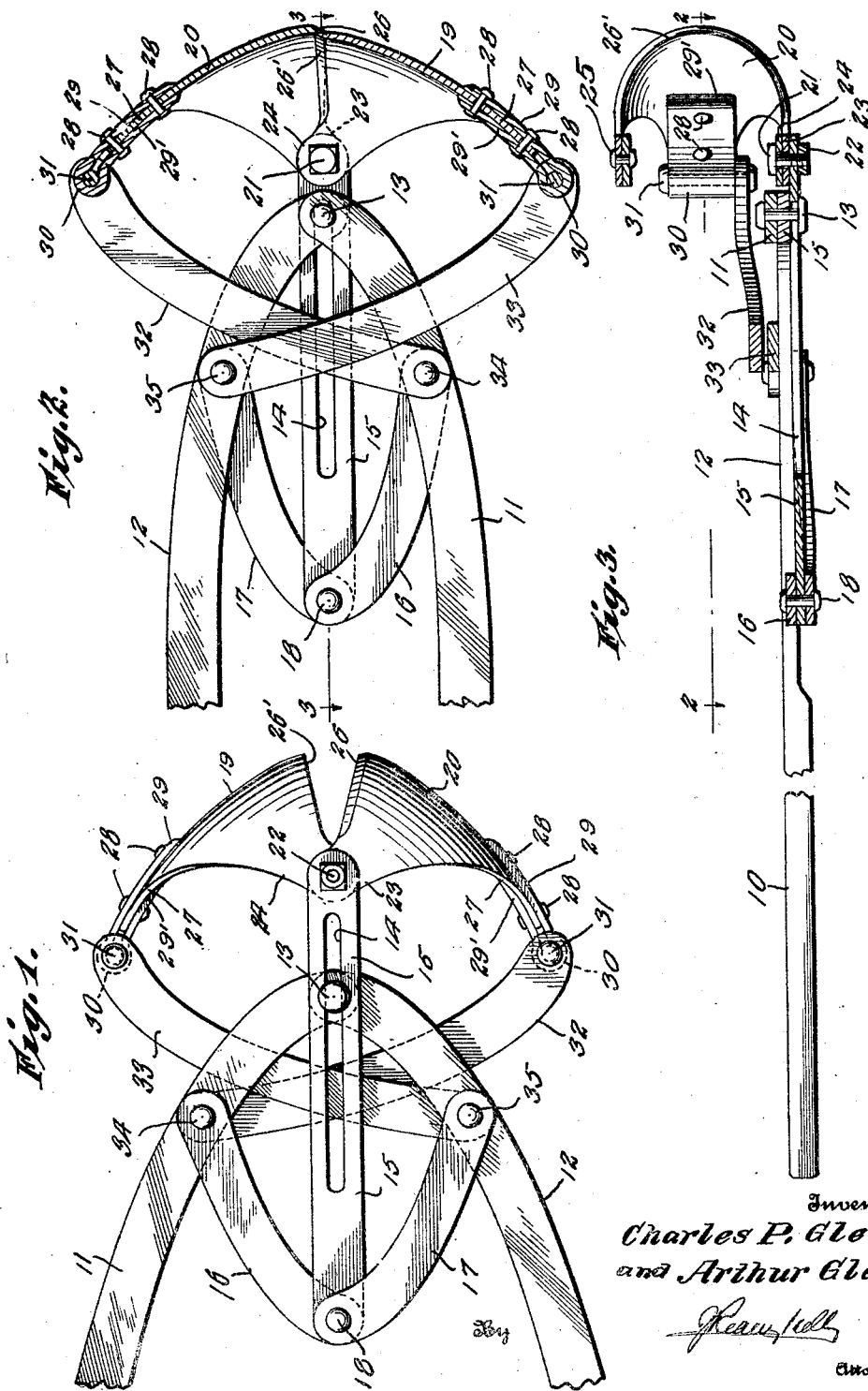

1,572,787

UNITED STATES PATENT OFFICE.

CHARLES P. GLEE AND ARTHUR GLEE, OF WHITE, NEBRASKA.

DEHORNER.

Application filed October 26, 1923. Serial No. 670,916.

*To all whom it may concern:*

Be it known that we, CHARLES P. GLEE and ARTHUR GLEE, citizens of the United States, residing at White, in the county of Hayes and State of Nebraska, have invented certain new and useful Improvements in Dehorners, of which the following is a specification.

This invention has reference to a cutting device designed to be used in removing horns from animals and provides a tool of this character which can be readily and quickly manipulated to cut the horn without undue physical effort on the part of the operator.

A further and additional object is to provide a dehorning device of generally improved construction and design embodying a leverage connection between the operating handles and the shearing blades of the device which serves to increase the pressure on the blades when the handles are moved to close the same.

Various other objects and advantages of the invention will become apparent from the following description.

Figure 1 is a fragmentary rear view of the proposed device, disclosing the leverage connection between the handles and the shear blades, Figure 2 is a front view thereof taken on the line 2—2 of Fig. 3, with the blades in closed position, the same being shown in sections to illustrate the manner of fastening the ends of the operating levers, and Figure 3 is a longitudinal sectional view taken on the line 3—3 of Fig. 2 illustrating more clearly the arrangement and association of the various parts of the device.

In constructing the device, the same is provided with a pair of handles 10 having their upper respective ends 11 and 12 overlapping and connected by a rivet 13 working in the longitudinal extending slot 14 of the guide plate 15. At its lower end, plate 15 is connected with handle portions 11 and 12 by means of the connecting links 16 and 17, the latter pivotally connected to opposite sides of the plate by means of a rivet 18. At its upper end the plate supports the shearing blades 19 and 20 of the device which are connected thereto by means of a bolt 21 and a nut 22, the former being inserted thru the overlapping ends 23 and 24 of the blades.

The shielding blades are preferably constructed of a single piece of material, of steel, of sheet metal or other selected material and are of arched formation as shown in the drawings so as to engage snugly about the horn to be cut. As shown in Figure 3, the shear blades are so supported by plate 15 as to be disposed upwardly and outwardly of one side thereof, being pivotally connected at their outer engaging ends by a suitable rivet 25. At their intersecting portions the blades are respectively provided with shearing edges 26, 26' adapted upon the closing of the blades to be brought together as shown in Figure 2, whereby the horn will be severed neatly and with a clean cut. Each blade terminates at its outer end in a shank 27 of tapered formation to the outer and inner surfaces of which are fastened, by rivets or other suitable fasteners 28, the terminal portions 29, 29' of a strap iron 30, the same presenting a loop as shown for engagement about fulcrum pins 31. Pins 31 are carried by curved connecting links 32 and 33 respectively and extend laterally at right angle from the same as clearly illustrated, the former having its lower end connected to the lever end 11 of one of the handles 10 at a point opposite the upper end of link 16 but on the opposite side of the handle, a rivet 34 providing a common means of connection for the said members and serving to pivotally support the same in relation to the handle. The lower end of link 33 is supported in a similar relation with lever end 12 of the handle and link 17, being pivotally connected therewith by means of the rivet 35. Hence, movement of handles 10 outwardly or inwardly with respect to each other will tend to turn the various connecting links on their pivots for opening or closing jaws 19 and 20.

In use, when the handles are moved outwardly, rivet 13 slides inwardly of guide slot 14 at the same time that rivets 35 move apart drawing links 32 and 33 crosswise of one another and swinging jaws 19 and 20 backwardly so as to separate the cutting edges 26 and 26', the parts being positioned as shown in Figure 1. To close the jaws the handles are brought together again as shown in Figure 2, the links 32 and 33 moving upwardly as lever portions 11 and 12 approach each other so as to force the jaws shut, the force exerted by members 32 and 33 under the pressure of the closing handles being directed against the shanks of the jaws in such manner as to cause the latter to easily turn on the pivots 21 and 25. It will be apparent that during such time the strain of the severing operation will be taken up and distributed by various pivot elements of the connection and hence will relieve the handles to such an extent that the opening and the closing thereof may be readily accomplished without undue physical effort on the part of the operator.

From the foregoing it is thought that the advantages and novel features of the invention can be readily understood and that further detail description thereof will not be necessary.

What is claimed is:

1. A dehorning device comprising a pair of handles, having their upper portions curved to present lever elements, a rivet pivotally connecting the ends of the said levers, a pair of relatively short and long links associated with each lever and having a common pivotal connection therewith, the said short links of each pair depending inwardly of the handles to provide hangers and the said long links being disposed crosswise of each other for lateral sliding movement and presenting outstanding fulcrum pins adjacent their respective outer ends, a bracket plate having one end pivotally supported between the inner adjacent ends of the said hanger links and presenting a longitudinal guide slot for the pivot of the said levers, a pair of co-operating shearing jaws pivotally supported at the upper end of the said bracket and having connection with the fulcrumed pins of the cross links whereby they will open and close upon corresponding movement of the said handle.

2. A dehorner comprising a pair of sheet metal blades of arched formation respectively presenting a forwardly disposed cutting edge and a rearwardly disposed tapered shank, integral side portions depending from each blade adjacent the cutting edge thereof, the side portions of one blade overlapping the corresponding side portions of the other blade, pivots connecting the said overlapping side portions, a supporting plate depending from one of the said pivots, handles pivoted to the said plate, links pivoted to the said handles, a loop on the shank of each blade, and means pivotally connecting the said links of the handles to the said loops.

In testimony whereof we affix our signatures.

CHARLES P. GLEE.
ARTHUR GLEE.